Jan. 6, 1925.

Re. 15,977

A. L. KANAGY ET AL

SECTIONAL FURNACE ROOF

Original Filed June 14, 1922 2 Sheets-Sheet 1

Inventors:
Abraham L. Kanagy
Walter H. Cotton
By
Gilson, Wood & Co.
Attys.

Jan. 6, 1925.

A. L. KANAGY ET AL

Re. 15,977

SECTIONAL FURNACE ROOF

Original Filed June 14, 1922

2 Sheets-Sheet 2

Inventors:
Abraham L. Kanagy
Walter H. Cotton

By Tillson, Hamm & Co.

Atty's.

Reissued Jan. 6, 1925.

Re. 15,977

UNITED STATES PATENT OFFICE.

ABRAHAM L. KANAGY AND WALTER H. COTTON, OF CHICAGO, ILLINOIS.

SECTIONAL FURNACE ROOF.

Original No. 1,440,468, dated January 2, 1923, Serial No. 568,243, filed June 14, 1922. Application for reissue filed February 15, 1924. Serial No. 693,144.

*To all whom it may concern:*

Be it known that we, ABRAHAM L. KANAGY and WALTER H. COTTON, citizens of the United States, and residents of Chicago, county of Cook, and State of Illinois, have jointly invented certain new and useful Improvements in Sectional Furnace Roofs, of which the following is a specification, and which are illustrated in the accompanying drawings, forming a part thereof.

The invention relates to brick furnace roofs, and particularly to that class of furnace used for melting metals, such as the malleable iron and open hearth types.

The invention is also particularly adaptable to boiler arches where the trusses are not exposed to the fire, such as in the Dutch oven type.

The objects of the invention are to provide a roof of increased stability relative to collapse; to provide easy means for repairs while the furnace is in operation; to provide simple and inexpensive means for supporting the fire brick; and to provide easy means for reloading with brick.

The invention is illustrated in the accompanying drawings, in which

Figure 1:
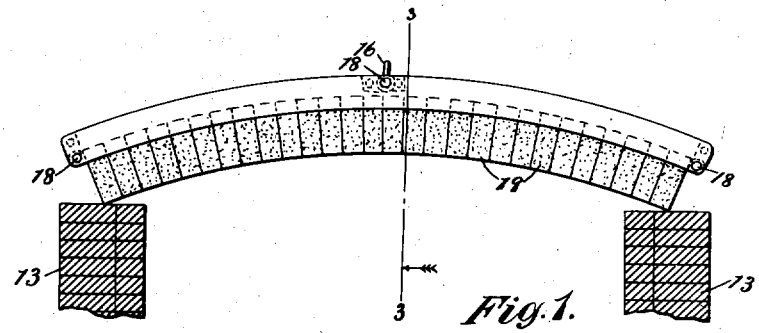
Fig. 1 is a side view of the roof section and setting as usually applied to malleable iron furnaces.
Figure 2:
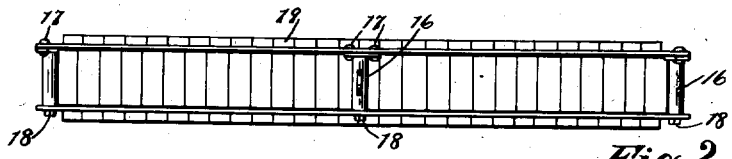
Fig. 2 is a plan.
Figure 3:
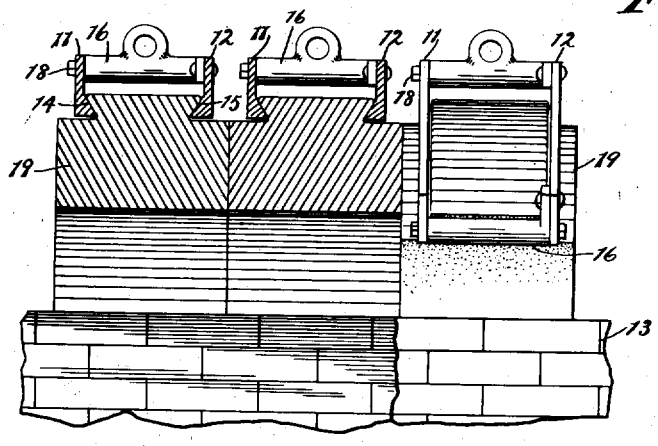
Fig. 3 is an elevation of three sections showing one in end elevation and two in cross-section on line 3—3 of Fig. 1.

In the drawing numeral 10 generally designates a truss which consists of two beams 11 and 12, of sufficient length to span the side walls 13 of the furnace. Ledges 14 and 15, extending inwardly from the beams 11 and 12, and spacing members 16 are permanently secured to the beam 12, as by rivets 17, and are removably secured to beam 11, as by cap screws 18. These spacing members hold the truss beams in parallel relation and are each provided with an eye so as to facilitate the withdrawal from the roof of a section by means of a crane, as is the usual practice in charging metal treating furnaces.

Figure 8:
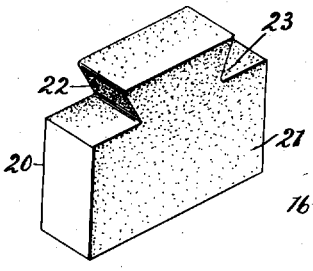
Fig. 8 is a perspective view of the brick.

The brick 19 (Fig. 8) in sections of the bowed or spring type of roof are made slightly tapered on the side, as 20, 21, to conform to the curvature of the roof, while in the flat roof the sides are parallel. The top of each brick is of dove-tail configuration, the sockets 22 and 23 being complementary in form to the ledges 14, 15, of the beams 11 and 12, which are so spaced that the dove-tailed ends of the brick may be slid into place, the ledges loosely fitting the sockets 22 and 23.

Figure 7:
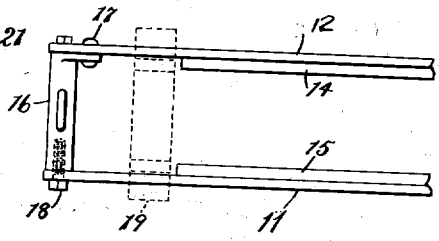
Fig. 7 is a plan view of a fragment of the truss showing brick supporting ledges and one method of inserting brick.

The bricks may be placed in the truss by inserting the dove-tailed head through a passage on each end, as shown by dotted lines in Fig. 7, and sliding into the ledges to the desired position, or by the spreading of the beams by loosening the cap screws which hold the beams rigidly to the spacing members. In practice, the latter method is usually employed, and when it is desired to place the bricks in position the truss is turned upside down and the beams are separated sufficiently to permit the insertion of the supporting head but not the body portion of the bricks. The bricks are laid in position with suitable fire clay, mortar or grout between the same and the beams are adjusted until the ledges engage the dovetail head leaving a slight clearance to compensate for expansion of the bricks. By this arrangement, the life of the bricks is prolonged in that they are not likely to become cracked or broken incident to their expansion since they are free to expand in all directions.

It is desirable that the brick at each end of each section rest upon the side walls of the furnace so there may be as little resistance to the expansion of the brick, due to the heat, as possible.

Figure 4:
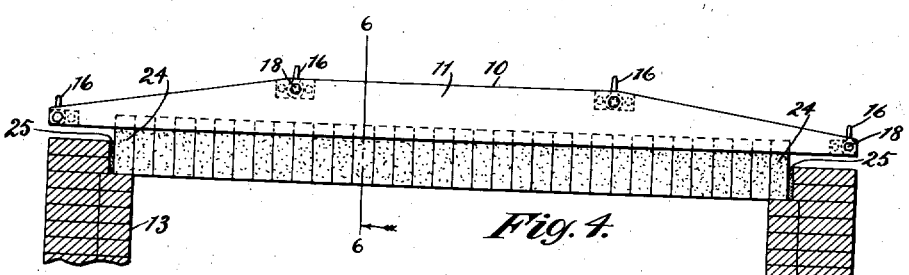
Fig. 4 is a side elevation of a modification of a roof section, showing the structure flat instead of bowed.
Figure 5:
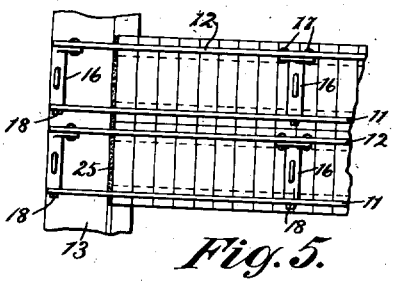
Fig. 5 is a plan view of a fragment of the structure shown in Fig. 4.

In Fig. 4 the end bricks 24 sit in a recess at the top of the side walls 13. The pockets 25 between the extension of the side walls and brick may be filled with fire clay to insure a perfect seal.

Figure 6:
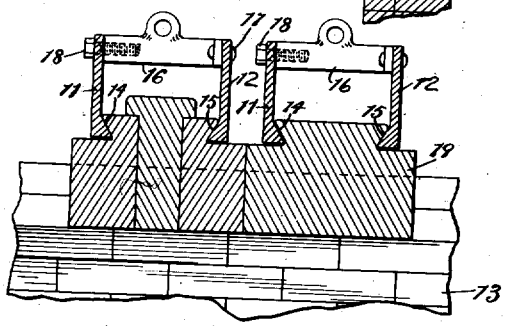
Fig. 6 is a sectional elevation of two sections on line 6—6 of Fig. 4, one of the sections being shown with a repair brick.

Should any brick fall the cavity may be quickly closed by inserting the repair brick shown in one of the sections of Fig. 6, or by sliding the adjacent brick to close the cavity and inserting a new one at the end for the abutment.

We claim as our invention:—

1. In a furnace roof, in combination, a plurality of sections each consisting of a pair of beams having projecting ledges, a plurality of bricks having projections complementary to and resting on said ledges, and means for adjustably holding the beams in parallel relation.

2. In a sectional furnace roof, in combination, a truss consisting of a pair of beams each having an inwardly projecting ledge, spacing bars, means for securing said beams and bars together, with said beams in parallel relation, such means associated with one of the beams being removable, and a plurality of bricks suspended from the ledges.

3. In a sectional furnace roof, a section consisting of a pair of beams, means for adjustably securing said beams in parallel relation, a ledge projecting inwardly from each of the beams, a plurality of bricks suspended from the ledges, the end brick being adapted to sit upon the side walls of the furnace and forming an abutment at each end for the entire section to rest upon.

4. The combination in a sectional furnace roof, of a pair of beams, a plurality of bricks having dove-tailed engagement with the beams, means including a plurality of spacing bars for holding the beams in parallel relation, and for permitting spreading of the beams for the purpose set forth.

5. In a sectional furnace roof, in combination, a truss consisting of a pair of beams spaced apart and held in parallel relation, brick holding ledges on the beams, a plurality of bricks, and means for permitting placing the brick in proper position on the ledges.

6. The combination in a sectional furnace roof, of a pair of parallel beams, a plurality of bricks having dove-tailed engagement with the beams and means for adjustably connecting said beams together.

7. The combination in a sectional furnace roof, of a pair of beams each having an inwardly projecting ledge terminating short of the ends of the beams, and a plurality of bricks having projections complementary to and adapted to be slid into position upon said ledges.

8. In a sectional furnace roof, a section consisting of a pair of parallel beams each having an inwardly projecting ledge, the ledges terminating short of the ends of the beams, and a plurality of bricks suspended from the ledges.

9. In a furnace roof, in combination, a pair of beams each having an inwardly projecting ledge, a repair brick comprising two vertical halves each half having a projection complementary to and adapted to rest upon one of said ledges, and a vertical key adapted to fit between said halves.

10. In a sectional furnace roof, in combination, a truss having a pair of brick suspending ledges extending substantially the entire length of the truss and means whereby the ledges may be moved to and from each other.

11. In a furnace roof, a truss member provided with ledges, a plurality of bricks having interlocking connection with said ledges, means for holding said ledges in spaced relation, including screw-threaded members for engaging said truss for permitting the spreading of said ledges.

ABRAHAM L. KANAGY.
WALTER H. COTTON.